United States Patent [19]

Heijnen et al.

[11] Patent Number: 4,490,258

[45] Date of Patent: Dec. 25, 1984

[54] SLUDGELESS OXIDATIVE BIOLOGICAL PURIFICATION PROCESS

[75] Inventors: Joseph J. Heijnen, SR 's-Gravenhage; Pieter A. Lourens, BT Delft; Cornelis P. Venema, JJ Delft; Albert J. Vroemen, AP Breda, all of Netherlands

[73] Assignee: Gist-Brocades N.V., Delft, Netherlands

[21] Appl. No.: 496,178

[22] Filed: May 19, 1983

[30] Foreign Application Priority Data
Aug. 27, 1979 [NL] Netherlands............ 79-06426

Related U.S. Application Data

[63] Continuation-in-part of Ser. No. 404,050, Aug. 2, 1982, abandoned.

[51] Int. Cl.$^3$ ............................................. C02F 3/08
[52] U.S. Cl. ................................ 210/617; 210/626; 210/631
[58] Field of Search ............... 210/603, 614, 616–618, 210/623, 626, 631, 151, 903

[56] References Cited

U.S. PATENT DOCUMENTS

| | | | |
|---|---|---|---|
| 3,422,007 | 1/1969 | Larkin ............................. | 210/626 |
| 3,855,120 | 12/1974 | Garbo ............................. | 210/618 |
| 3,980,556 | 9/1976 | Besik ............................. | 210/616 |
| 4,009,099 | 2/1977 | Jeris ............................. | 210/618 |
| 4,069,148 | 1/1978 | Hutton et al. .................. | 210/616 |
| 4,200,524 | 4/1980 | Levin ............................. | 210/616 |
| 4,227,998 | 10/1980 | Reimann ........................ | 210/631 |
| 4,253,947 | 3/1981 | Fan et al. ...................... | 210/618 |
| 4,256,573 | 3/1981 | Shimodaira et al. ............ | 210/618 |

FOREIGN PATENT DOCUMENTS

| | | | |
|---|---|---|---|
| 54-107156 | 8/1979 | Japan .............................. | 210/618 |
| 1341107 | 12/1973 | United Kingdom . | |

*Primary Examiner*—Peter Hruskoci
*Attorney, Agent, or Firm*—Charles A. Muserlian

[57] ABSTRACT

An oxidative biological purification process for waste water in a fluidized-bed reactor at a pH between 5 and 8 in the oxidation space comprising passing waste water upwards through an air-sparged oxidation space containing aerobic biomass attached to insoluble carrier particles of a size of 0.1 to 2 mm with a specific gravity of 2 to 5 g/cm$^3$ at such a rate that space loads of COD of 4–50 kg/m$^3$ day are achieved while continuously and completely separating purified waste water leaving the oxidation space from said attached aerobic biomass, whereby the aerobic biomass prevails to at least a very substantial extent in a state of attachment to said carrier particles, undue surplus formation of said sludge being minimized by continuous control of the residence time of the waste water to be treated in the oxidation space between the limits of 0.3 to 20 hours, and at least all attached aerobic biomass is recycled to the oxidation space by way of settling. Preferred embodiments include placing of a relatively smaller settling tank above the oxidation space, the use of sand as carrier material, gas and liquid flows being the only sources for stirring applied continuously, and purification at a temperature of 30°–50° C. The process gives a reliable waste water purification at a low level of surveillance even when considerable variations occur in the supply of COD and in the pH of the waste water introduced.

7 Claims, 1 Drawing Figure

U.S. Patent  Dec. 25, 1984  4,490,258
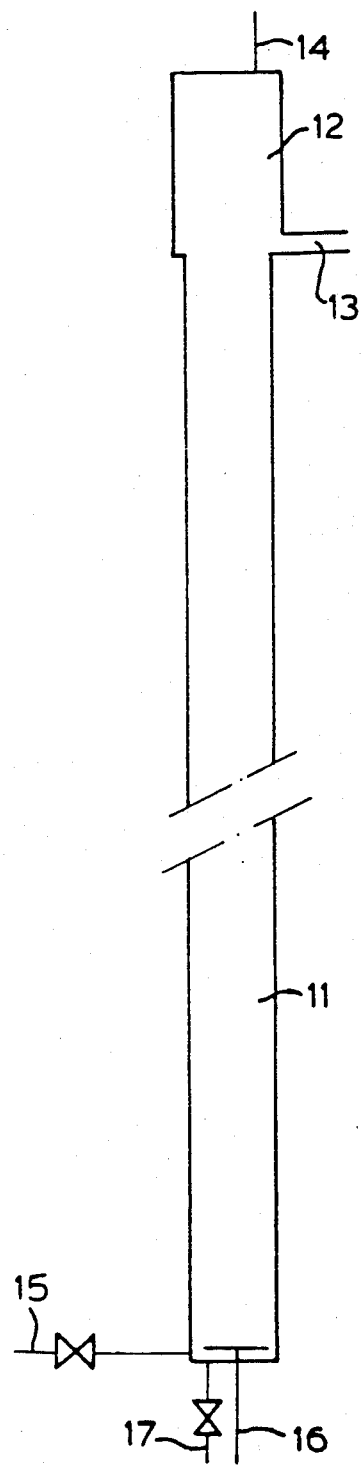

SLUDGELESS OXIDATIVE BIOLOGICAL PURIFICATION PROCESS

PRIOR APPLICATION

This application is a continuation-in-part of our copending U.S. patent application Ser. No. 404,050 filed Aug. 2, 1982, now abandoned, which in turn is a continuation of our U.S. patent application Ser. No. 181,360 filed Aug. 26, 1980, now abandoned.

STATE OF THE ART

British patent No. 1,341,107 describes an oxidative biological purification process for waste water wherein waste water from industries processing agricultural products or from food industries having strongly contaminated waste water with a COD which can be even higher than 16 kg/m$^3$ is fed at a constant rate into an oxidation space wherein the temperature is maintained between 12° and 40° C. and the water is kept in turbulent motion by injecting air in an amount of 0.2-2 m$^3$/m$^3$ of water-min. so that the solids and the aerobic biomass are homogenously distributed in the waste water. Thus, with an air-flow rate in the oxidation space between the claimed limits and with complete recycling of aerobic biomass separated from the purified water by centrifugation, filtration or settling and with a space load per day between the claimed limits, stable conditions are achieved with a relatively high, substantially constant sludge concentration in the oxidation space under which conditions the energy released by the oxidation of the COD supplying substances is used for maintenance of the aerobic biomass and a considerable reduction of the waste water COD is obtained.

The example of the said British patent describes the purification of the waste water of a sugar mill, said waste water with a COD of 5.4 kg/m$^3$ being passed at a constant rate of 2 m$^3$/hour through a reactor 8 m in height and 1.6 m in diameter with a volume of 16 m$^3$ wherein a temperature of 20° C. is maintained and wherein, due to a cylinder jacket concentrically arranged around the axis at the bottom of the reactor and by injecting 0.55 m$^3$/min. of air per m$^3$ of non-expanded waste water, an intensive circulation of waste water is obtained. With a residence time of 4 hours in the reactor and with complete recycling of the aerobic biomass, a sludge concentration in the oxidation space of 40 g/l of dry substance accumulated and a COD reduction of the waste water of 5 kg/m$^3$ (92% of the initial COD) was obtained.

The said process is quite suitable for purifying waste water with a substantially constant COD, e.g. waste water from a sugar mill for which a constant waste water flow rate can be realized in a simple manner because also the amount of waste water produced per hour is substantially constant, but the said process is not very practical.

Separating aerobic activated sludge from a purified water by centrifugation or filtration requires a great amount of energy, while separating said sludge which was dispersed homogeneously in the waste water by settling is a slow process which requires a very large settling tank. Further, in practice, waste water having a constant COD is not common and also the amounts of waste water which are available for purification vary greatly generally.

In principle, these considerable problems arising in practice in the separation and the recycling of not attached biomass can be circumvented by using so-called fluidized-bed reactors, wherein the microorganisms grow and multiply while attaching to insoluble carrier particles of suitable dimensions.

Such fluidized-bed reactors suitable for purification of waste water or for related biological conversion and/or processes and procedures describing methods to use the fluidized-bed principle for e.g. the purification of waste water have been the object of several patents in the prior art. But, although a more or less efficient retention of biomass in these reactors has been achieved allegedly or can be derived from the descriptions of waste water purification methods, it was apparently not conceived or believed to be possible to combine this advantageous result with elimination or substantial elimination of generation of excessive growth of biomass in these fluidized-bed reactors or in such process descriptions by a purely empirically based procedure derived from considerable trial and error as is possible in the present invention.

Furthermore, from the descriptions in the patent literature cited below concerning the use of the fluidized-bed principle in one way or the other, it is obvious that application of the fluidized-bed principle in connection with excessive growth of biomass has the considerable disadvantage that the biological material grown in excess over the appropriate amount has to be stripped off from the carrier particles by e.g. mechanical abrasion, or by other sophisticated means within or outside the oxidation space as is described extensively in for instance U.S. Pat. Nos. 4,009,098 and 4,009,099. The prevention or very substantial prevention of excessive accretion of biomass, which is possible by the process of the present invention using the fluidized-bed principle, therefore can have as a considerable additional advantage the saving of sophisticated aids and appliances otherwise necessary in the separation and removal of excessively grown biological material.

Accordingly, the various processes of the prior art using the fluidized-bed principle in one way or the other always involve excessive production of aerobic biomass whereby it is noted that substantially not producing excessive biomass is not the same as maintaining a more or less constant quantity of biomass in the oxidation space by diligent continuous removal of excess biomass from the oxidation space during the conversion, while also noting that the flow rate has a fixed relation to the residence time only if the flow rate pertains to waste water not diluted with e.g. tap water or recycled purified waste water.

For instance, U.S. Pat. No. 4,009,098 dealing with aerobic removal of COD describes a process characterized by the obviously much desired use of allegedly effective very high flow rates, but in the best practical run 2 of Example III therein pertaining to treatment of domestic waste water, a COD removal efficiency of only 20% was reached while maintaining a detention or residence time of only 5 minutes, and producing excessive biomass partly as a consequence of insufficient consumption of oxygen. This process further involves maintenance of a nearly constant quantity of biomass in the oxidation space by continuous removal of excessive biomass with the help of mechanical abrasion of biomass from overgrown particles. The abrasion takes place preferably within the oxidation space by means of a flexible stirrer adjusted in the top of the oxidation space with the result that the oxidation space always contains a considerable amount of non-attached biomass. Alternatively, the abrasion takes place in a separate installation necessitating return of bare particles by pumping. In nòne of the embodiments is it conceivable to effect separation of biomass in a tank placed above the reaction space. All the embodiments by necessity involve continuous separation outside the oxidation space of purified liquid from substantial amounts of non-attached excessively formed biomass which for the greater part is not returned into the oxidation space.

U.S. Pat. No. 4,009,099 of which the process is characterized by the same approach and by much the same technology as already indicated in U.S. Pat. No. 4,009,098 is directed to nitrification of ammonia-containing waste water. The process of the said patent is obviously effective at very high flow rates, according to the example possibly also relating occasionally to quite low residence times, but the experimental proof given is limited to liquids containing rather low concentrations of ammonia as prevailing for instance in pretreated domestic waste water. Similarly, although the nitrifying microorganisms are characterisitcally much less inclined to take up nutrients for multiplication, this process is also according to its description associated intimately with excessive production of biomass, so that it is again required to abrade overgrown particles inside or outside the oxidation space by stirring, and to manipulate abraded biomass and/or bare carrier particles, etc.

In the direct sense, the process of U.S. Pat. No. 4,227,298 does not relate to the use of the fluidized-bed principle, but the formation of bulking sludge prevailing in many activated sludge processes is prevented herein by adherence to calcium carbonate gradually precipitated in situ during the conversion by continuous and pH-controlled introduction of a gas containing at least 50% of oxygen and at least 5% of carbon dioxide (usually more than 20%) into the normally alkaline waste water of in particular sugar industries, which waste water contains a high concentration of dissolved calcium. As appears from lines 60–62 of column 3, this process also produces a substantial amount of excessive biomass to be removed via adherence to calcium carbonate, while using residence times of at least 30 hours. The process appears to be adequate, but is in need of a sufficient concentration of calcium, while the carbon dioxide needed to precipitate calcium and to maintain a suitable pH is not primarily derived from oxidative conversion of COD present in the waste water, and a gas enriched in oxygen has to be used.

As is quite clear from its description of the invention, the process of Japanese laid open application No. 54-107156 intrinsically and intentionally is also associated with the production of excessive biomass. As inferred therein, this process may constitute an improvement over otherwise similar processes such as the ones of U.S. Pat. Nos. 4,009,098 and 4,009,099 in that by creating a static zone on top of the fluidized-bed, the expansion of which presumably is more rigidly restrained, it is possible in principle to prevent wash-out of attached biomass and/or of bare carrier particles which wash-out alleged therein as being a drawback of such prior art processes which use mechanical stirrers causing non-uniform motions and chanelling in the top of the usually too much expanded fluidized-beds. The necessary abrasion of too much overgrown carrier particles in this process takes place with the help of uniformly dispersed harmonious motions provided for by the vibration of air dispersing tubes placed in the lower section of the static zone having a larger diameter than the reaction space or by an ultrasonic oscillator placed in the static zone or in the top of the fluidized-bed. This process therefore intentionally involves the existence of a gradient in the thickness of the attached biolayers over the length of the fluidized-bed to abrade only too much overgrown particles. It is thereby presumably less difficult to maintain a nearly constant concentration of biomass in the reaction space, so that the not so easily controllable recycling of abraded biomass can be minimal, but said gradient also involves incomplete use of the reaction space in terms of removal of waste water contaminants. Therefore the said process is also associated with the continuous use of a separate installation for the separation of purified waste water from excessive biomass abraded.

In lines 9-55 of column 3 of U.S. Pat. No. 4,256,573, it is brought forward that prior art processes using the fluidized-bed principle by passing the waste water upwards through a bed consisting of bio-layers attached to carrier particles of a specific gravity greater than 1 have the disadvantage that gas introduced or gas formed during the biological conversion invariably causes wash-out of at least part of the attached biomass, and also that gas introduced often results in confusion of the fluidized-bed approaching the completely mixed state characteristic of the older activated sludge processes. In the process of said patent, such disadvantages do not exist while employing the fluidized-bed principle by passing the liquid downwards at a carefully controlled linear velocity through a fluidized-bed consisting of biomass attached to carrier of a specific gravity of preferably below 0.9. Moreover, according to the description, gas formed or introduced expediently promotes maintenance of the fluidized state and gas introduced effects abrasion of biomass in an appropriate way, not too little and not too much according to lines 39–52 of column 5. This means however, that excessive biomass is formed, has to be abraded, and has to be separated continuously from the purified liquid in a separate installation, while, when using the universally applicable apparatus of FIG. 2 for the purpose of oxidative removal of COD, additional abrasion by an impeller mounted in the central draft pipe appears to be desirable (column 8, lines 39–47). A further disadvantage of this ingenious and apparently effective process relates to the carrier material to be employed. In order to be effective and not result in the necessity of removal of part of the carrier material during operation as consequence of absorption of water or of formation of too thick attached bio-layers, the carrier should not absorb water and its surface has to be at the same time coarse and non-porous. A suitable light in weight carrier therefore is expensive by itself or becomes costly by the necessary treatments to introduce the desired qualities.

OBJECTS OF THE INVENTION

It is an object of the invention to provide an improved oxidative biological purification process for waste water having a highly variable COD and capable of handling variable amounts of waste water without concomitant production of substantial amounts of aerobic activated biomass.

It is another object of the invention to provide an oxidative biological process for purifying waste water that can be handled by unskilled personnel.

These and other objects and advantages of the invention will become obvious from the following detailed description.

BRIEF DESCRIPTION OF THE DRAWING

The drawing shows a column for purifying waste water according to the instant process.

THE INVENTION

The oxidative biological purification process of the invention for waste water in a fluidized-bed reactor at a pH between 5 and 8 in the oxidation space comprises passing waste water upwards through an air-sparged oxidation space containing aerobic activated biomass attached to insoluble carrier particles of a size of 0.1 to 2 mm with a specific gravity of 2 to 5 g/cm$^3$, at such a rate that space loads of COD of 4–50 kg/m$^3$ day are achieved while continuously and completely separating purified waste water leaving the oxidation space from said attached aerobic activated biomass, the improvement comprising that the waste water is purified by aerobic activated biomass prevailing to at least a very substantial extent in a state of attachment to said insoluble carrier particles under conditions of considerable stirring motions imparted to the fluidized-bed, while, minimizing undue surplus formation of aerobic activated biomass by continuous control of the residence time of the waste water to be treated in the oxidation space between the limits of 0.3 to 20 hours, and recycling at least all aerobic activated biomass attached to carrier particles into the oxidation space by gravitational separation of purified waste water from aerobic activated biomass attached to carrier particles.

In this process, it is preferred to impart stirring motions to the fluidized-bed in the continuous sense only by the flows of liquid and of the oxygen containing gas in particular. Suitably therefore, the liquid, i.e. the waste water to be treated, whether or not diluted with recycled purified waste water, as well as the gas are introduced into the lowest possible section of the oxidation space.

Though it is occasionally possible depending on the individual set of conditions to augment if so desired the stirring motions by dilligent operation of a suitable additional stirring device, the use of an additional stirring device in the beginning during the incipient formation of attached bio-layers and/or later on during the actual waste water treatment does not constitute a preferred embodiment in view of the always latent present danger of total or partial abrasion of the bio-layers attached firmly to the insoluble carrier particles.

Furthermore, while applying an appropriate residence time of the waste water to be treated in the oxidation space, said residence time being related to the not diluted waste water, and a degree of oxygenation sufficient for substantially very selective conversion of COD into carbon dioxide which means an oxygen uptake of 1 gram for the conversion of 1 gram of COD, the flows of liquid and gas in the process of the invention are sufficient indeed to ensure homogeneous fluidization of the overgrown particles, suitable expansion of the fluidized-bed, and good generation of stable enough bio-layers attached to carrier particles. Since the flow of gas particularly contributes to the generation of sufficiently motion resistent bio-layers, it is preferred to introduce the oxygen as air.

In sharp contradistinction to the picture surging up during inspection of the descriptions of various prior art processes, it was unexpectedly found to be possible to refrain at least very substantially from production of excessive biomass which excessive biomass makes the preservation of stable enough attached bio-layers practically impossible and leads to considerable additional expenses in view of the then necessary continuous removal of excessive biomass with the help of a separate installation and destruction of the secured excessive biomass by e.g. incineration for which this biomass has to be dehydrated very substantially. Perhaps even more unexpected was the result that this advantageous feature could be combined with the achievement of industrially acceptable space loads of conversion of 4–50 kg/m$^3$ day of COD present in waste waters.

By much trial and error, it was empirically found that this fortunate and most important aspect of the invention could be achieved by continuous control of the residence time of the liquid in the oxidation space, the expedient range for the appropriate residence time being primarily determined by the temperature selected for the conversion, in that the upper limit of the appropriate residence time range increases with the decrease in temperature. While always maintaining a sufficient transfer of oxygen to the liquid-solids mixture of the fluidized-bed to prevent anyhow undue accretion of biomass as consequence of a shortage in oxygen (an oxygen consumption of less than 1 gram per gram of COD converted), a substantially sludgeless purification is achieved with the help of well-functioning, sufficiently firmly attached bio-layers if the residence time is large enough to impede further undue accretion of biomass by a sufficient uptake of oxygen with respect to the COD load introduced, and is small enough to ensure formation and preservation of stable bio-layers attached to carrier particles of constant or nearly constant average thickness under conditions of introducing sufficiently strong stirring motions effected preferably only by the flow of gas and liquid. It was found empirically that in the process of the invention, too extended residence times either did not result in attachment at all or resulted in attached bio-layers of insufficiently constant average thickness.

This means that at any temperature between 10° and 60° C. the residence time can be manipulated within a certain appropriate range, the extension and the position in the time scale of which is determined primarily by the temperature selected. In the range of temperature wherein oxidative biological purification of waste water can be carried out effectively, in practice therefore between 10° and 60° C., the appropriate range for the residence time falls between the limits 0.3 and 20 hours. Suddenly occurring alterations in the supply of COD can be taken care of to a large extent primarily by an adjustment of the residence time within the appropriate range, but such an adjustment hasC to be compatible with a sufficient supply of oxygen (the uptake of 1 gram of oxygen per gram of COD converted) so that the oxygen content of the off-gas has to be monitored as well.

At constant purification conditions, the amount of attached biomass appearing in the settling tank is constant or nearly constant, and the oxygen content in the off-gas is constant or nearly constant as well. This means that at appropriate fixation of the residence time, the purification then proceeds sludgeless or nearly sludgeless. Of course, at a sudden alteration of the COD content of the waste water introduced, the amount of attached biomass appearing in the settling tank and the oxygen content of the off-gas will change accordingly. Then and during a relatively short time needed to restore adequate conditions, the purification can be accompanied with the generation of some unattached biomass and/or of too much overgrown carrier particles. Therefore only at such only temporary prevailing conditions, the purification may not be a substantially sludgeless process and/or may not be a process wherein all the biomass present is duly attached.

The process of the invention therefore provides for a reliable oxidative waste water purification with a smooth separation of the aerobic activated biomass from the purified water, even when the COD of the waste water varies between about 300 g/m$^3$ (domestic waste water) and 20 kg/m$^3$ (a value which may appear in waste water of the fermentation industry) and even when amounts of waste water available from one source or from a general reservoir varies, under conditions of virtually total attachment of aerobic activated biomass to a carrier and of separation of attached biomass from the purified waste water leaving the oxidation space by settling.

The carrier particles with the attached aerobic activated biomass are heavy enough to result in rapid and smooth settling so that supervision of the settling itself by skilled persons is practically unnecessary. Normally, surveillance of the overall process entails little more than monitoring the oxygen content in the off-gas and the COD load introduced into the oxidation space which can be carried out simply in an automatic fashion. From the oxygen content in the off-gas and the air-flow rate, the uptake of oxygen is calculated continuously. This uptake of oxygen has to be in harmony with the continuously measured COD conversion, i.e. at least one gram of oxygen for each gram of COD converted. If the uptake of oxygen is too low in relation to the COD conversion achieved, this is an indication that excessive biomass is produced. This situation is then corrected by lowering the COD load introduced in the oxidation space or by increasing the liquid residence time. Though normally not necessary, it is advisable to control preferably in an automatic fashion, from time to time also the carbon dioxide content of the off-gas to be able to react adequately on truly great deviations of the pH from neutrality in the waste water introduced.

It is to be added that operation of the process of the invention may involve dilution of untreated waste water in relation to the COD content of the waste water or a change in the rate of dilution. Since dilution per se only changes the average COD content of the liquid and not the deviations from the average COD content, it is in this process preferred to effect dilution with recycled waste water and not with tap water or water otherwise present in the environment.

The settling tanks used with the process of British patent No. 1,341,107 due to the nature of the dispersed sludge are so large that they must necessarily be situated upon or in the ground so that special provisions, e.g. recycle lines with pumps, are required for recycling the settled sludge to the oxidation space. In this respect, the prior art processes using the fluidized-bed principle offer only a partial solution to this problem, in that, if it is indeed possible to retain in the oxidation space the attachment part of the biomass present, the tanks needed for continuous separation of abraded excessive biomass from purified waste water can be relatively smaller and can be placed at the same level as the oxidation space. But, apart from other considerations such as the presence of an additional stirrer in the top of the oxidation space, it is for those processes still not conceivable to have separation tanks for the removal of substantial quantities of unattached sludge on top of the oxidation space.

However, in applying biomass on carrier according to the process of the present invention, the overall dimensions of the settling tank can be so small relatively that it can be placed not only at a higher level than the oxidation space but preferably even on top of the oxidation space, whereby a considerable saving of floor space is realized and, moreover, the settled biomass can be recycled to the oxidation space by gravity without the help of e.g. pumps. To reach adequate settling of the attached biomass in a settling tank of an appreciably smaller volume as compared with the volume of the oxidation space, the dimensions of the tank in relation to the dimension of the oxidation space preferably are such, that, as indicated schematically in the drawing, the height of the tank is considerably smaller, while its cross section is somewhat greater so that the part of the attached biomass which leaves the oxidation space with the purified waste water has a sufficiently large area for settling.

For the carrier to which the biomass is attached, any granular material having a specific gravity of more than 1000 kg/m$^3$ can be used. Sand having an average granular size of from 0.1-2 mm is preferred as carrier and such sand is readily available and is inexpensive, has good mechanical properties (it does not disintegrate) and a favorable specific gravity, and aerobic activated sludge adheres quite well to sand.

The granular size of 0.1-2 mm provides particles covered with activated biomass with an optimum effective surface. Particles smaller than 0.1 mm are not suitable because the particles overgrown with biomass settle rather poorly and particles having a diameter greater than 2 mm have such a small specific surface for attaching biomass thereto that the biomass concentration to be reached in the oxidation space is insufficient.

The oxidative biological purification process of waste water of the present invention can be effected at the temperature automatically arising in the oxidation space. For domestic waste water usually having a temperature of 10°-20° C., this means that purification is effected at a temperature between 10° and 20° C. In general, industrial waste water has a higher temperature of between 10° and 60° C. and therefore, the purification is suitably effected at a temperature between 10° and 60° C., but preferably between 30° and 50° C., because at a temperature of 30°-50° C. the capacity of the microorganisms to convert COD is optimal, while in this range of temperature the natural inclination of the microorganisms to consume nutrients for multiplication is smaller than in the range of 10°-30° C., as is known in the art. Such a temperature is generally easily reached for industrial waste water because industrial waste water is usually warm and has a high COD causing some rise in temperature with the aerobic purification.

The distribution of the carrier particles with the aerobic activated biomass attached thereto in the oxidation space is suitably promoted, as is known per se from the prior art, by injecting air. If so desired, the stirring motions can be augmented by diligent operation of a suitable additional stirrer, but as explained before, the use of an additional stirrer is not preferred because it might endanger preservation of the attached state of the biomass present, while its use involves additional operational expenses in more than one way, e.g. energy costs and depending on the nature of the stirring device possibly also a more expensive construction of the settling tank. The injected air also provides the oxygen supply needed for selective conversion by oxidation of the COD of the waste water.

Due to the good distribution of the carrier particles with the aerobic activated biomass attached thereto in the oxidation space and due to complete attachement to carrier particles of the biomass present in sufficiently firm bio-layers, even waste water with strongly alternating composition can be purified without more and it is not necessary to take special provisions to smooth out occurring variations in the COD-content in the influent waste water by e.g. mixing with waste water of a different COD-content. The process therefore is amenable to the purification of waste water supplied from a general reservoir without intentional mixing, by e.g. stirring, of various waste waters flowing into the reservoir.

In this process, it is normally also not necessary to apply preceding pH-corrections in the influent waste water since even when the pH of the influent waste water varies between 3 and 11, the pH in the oxidation space appears to be stabilized between 5 and 8, because in this process it is possible to maintain a sufficiently strong carbon dioxide/bicarbonate buffer in the oxidation space in a natural way due to conversion of COD present in only or nearly only carbon dioxide. If the pH of the influent waste water falls between the limits of 3 to 11, a sufficiently strong natural carbon dioxide/bicarbonate buffer can be maintained by adjustment of the air flow to give an off-gas containing at least 5 vol. % of oxygen which off-gas then also contains 1-15 vol. % of carbon dioxide. The carbon dioxide content of the off-gas naturally is influenced to some extent by the pH residing in the oxidation space and by the average state of oxidation already prevailing in the contaminants of the waste water (therefore to the nature of the contaminants), but in general the balance in the off-gas between the oxygen content and the carbon dioxide content is determined to large extent by the height of the fluidized-bed as is known in the art, so that in industrially size reactors having oxidation spaces of a height of about 10 meters or more, the flow of air is preferably set to give an off-gas containing 5 to 15 vol. % of carbon dioxide. Hereby it is mentioned, that at the same time the oxygen content in the off-gas is inversely proportional to the height of the fluidized-bed, but that an oxygen content in the off-gas of at least 5 vol. % is sufficient in view of two prerequisites of this process, in that sufficient oxygen has to be transferred to the liquid-solids mixture to achieve conversion of COD into only or nearly only carbon dioxide, and a sufficient flow of air has to be introduced to achieve good fluidization and suitable expansion of the fluidized-bed as well as to generate and to maintain firm attachment of biomass to carrier particles. With respect to the second prerequisite, it may be inferred that the carbon dioxide generated everywhere in the fluidized-bed is of help since it replaces the oxygen consumed.

The present invention is illustrated in the Example with reference to the drawing which schematicaly shows an oxidation space in the form of a vertical column for purifying waste water which is passed in an upward direction through the column by aerobic activated biomass and a settling tank mounted on top of the oxidation space wherein the activated biomass attached to a carrier is separated from purified waste water and is directly recycled into the oxidation space.

EXAMPLE

This example describes the oxidative biological purification of waste water in a column as shown in the drawing. Column 11 had a height of 6.5 m, a diameter of 25 cm and a useful volume of 300 l and on top of column 11 was a settling tank 12 with a height of 75 cm provided with an overflow with outlet for purified water 13 and with a degassing line 14. At the bottom of the column, there was an inlet 15 for waste water as well as an air inlet 16 provided with star-shaped distributor. Steam vapor could be injected via vapor line 17 to control the temperature in the column.

The column was filled with 80 kg of silver sand having a particle size of 0.1–0.3 mm, a density of 2.6 g/cm$^3$ and a bulk density of 1.65 g/cm$^3$. Subsequently, waste water having a COD of 300 mg/l was fed into the column at a rate of 790 l/hour with a residence time in the column of 0.38 hours and 20 Nm$^3$/hour of air was injected via line 16 into the column (air velocity calculated on cross-section of empty column of 11 cm/s). The temperature of the waste water in the column was maintained at 40° C. by injecting steam via line 17 and the pH was controlled between 6 and 8.

After one week, the silver sand granules were overgrown with a layer of activated biomass with a biomass concentration of 15 g/l of reactor volume and stationary conditions were reached, whereby all the biomass on the carrier was separated in the settling tank from the purified waste water and recycled to the oxidation column by gravity. Under the said conditions with a COD load of the oxidation space of 20 kg/m$^3$ day, a COD reduction of 70% was achieved and the oxygen consumption was 1.1 kg of O$_2$ per kg of converted COD which means that all the COD was converted to carbon dioxide.

Various modifications of the process may be made without departing from the spirit or scope thereof and it is to be understood that the invention is to be limited only as defined in the appended claims.

We claim:

1. A substantially sludgeless process for oxidative biological purification of waste water in a fluidized-bed reactor at a pH between 5 and 8 in the oxidation space comprising passing waste water upwards through an air-sparged oxidation space containing a fluidized state aerobic activated biomass attached to insoluble carrier particles of a size of 0.1 to 2 mm with a specific gravity of 2 to 5 g/cm$^3$, at such a rate that space loads of COD 4–50 kg/m$^3$ day are achieved while continuously and completely separating purified waste water leaving the oxidation space from said attached aerobic activated biomass, the improvement comprising that the waste water is purified with an aerobic activated biomass attached to said insoluble carrier particles under conditions of considerable stirring motions imparted to the fluidized-bed while, minimizing surplus formation of aerobic activated biamass by continuous control of the residence time of the waste water to be treated in the oxidation space between the limits of 0.3 to 20 hours, and degassing the purified waste water leaving the oxidation space in a separator placed above the oxidation space, while separating by gravity the solids, which are the biomass attached carrier particles, from the purified waste water and accomplishing the return of all the separated solids into the oxidation space by means of recycling by gravity forces alone and finally removing the purified waste water from the separator, wherein to prevent surplus formation of aerobic activated biomass and to exert at the same time adequate control of the pH in the oxidation space with the help of a sufficiently strong natural bicarbonate-carbon dioxide buffer formed only by oxidative microbiological carbon dioxide production from organic compounds of the waste water to be treated, the residence time of the waste water to be treated in the oxidation space is balanced to consume at least one gram of oxygen for each gram of COD converted, and the air-flow rate is maintained so that off-gas from the separator contains at least 5% by volume of oxygen and 1 to 15% dry volume of carbon dioxide.

2. The process of claim 1 wherein the introduction of oxygen-containing gas and the introduction of liquid are the only means present for the continuous generation of stirring motions in the oxidation space.

3. The process of claim 2 wherein the air is used as the oxygen-containing gas.

4. The process of claim 1 wherein the aerobic activated sludge is attached to particles of sand.

5. The process of claim 1 wherein the temperature in the oxidation space is 10° to 60° C.

6. The process of claim 5 wherein the temperature is 30° to 50° C.

7. The process of claim 1 wherein the waste water to be treated is fed into the oxidation space without pH-correction and/or without flattening of peaks in the COD content of the waste water and only recycled purified waste water is used to dilute the influent waste water to be treated.

* * * * *

UNITED STATES PATENT AND TRADEMARK OFFICE
CERTIFICATE OF CORRECTION

PATENT NO. : 4,490,258

DATED : Dec. 25, 1984

INVENTOR(S) : JOSEPH J. HEIJNEN, PIETER A. LOURENS, CORNELIS P. VENEMA, ALBERT J. VROEMEN

It is certified that error appears in the above-identified patent and that said Letters Patent are hereby corrected as shown below:

| Col. | Line | |
|---|---|---|
| 6 | 55 | "hasC" should be --has-- |
| 10 | 60 | "biamass" should be --biomass-- |
| 11 | 14 | "dry" should be --by-- |

Signed and Sealed this

Third Day of September 1985

[SEAL]

Attest:

DONALD J. QUIGG

Attesting Officer — Acting Commissioner of Patents and Trademarks - Designate